United States Patent
Koizumi

(10) Patent No.: US 9,866,726 B2
(45) Date of Patent: Jan. 9, 2018

(54) IMAGE COMMUNICATION APPARATUS, METHOD FOR CONTROLLING IMAGE COMMUNICATION APPARATUS, AND STORAGE MEDIUM

(71) Applicant: CANON KABUSHIKI KAISHA, Tokyo (JP)

(72) Inventor: Shigeru Koizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/228,925

(22) Filed: Aug. 4, 2016

(65) Prior Publication Data
US 2017/0041497 A1 Feb. 9, 2017

(30) Foreign Application Priority Data
Aug. 6, 2015 (JP) ................... 2015-155926

(51) Int. Cl.
- *H04M 11/00* (2006.01)
- *H04N 1/327* (2006.01)
- *H04M 1/57* (2006.01)
- *H04N 1/00* (2006.01)

(52) U.S. Cl.
CPC ......... *H04N 1/32728* (2013.01); *H04M 1/57* (2013.01); *H04N 1/00206* (2013.01); *H04N 2201/0093* (2013.01)

(58) Field of Classification Search
CPC ........... H04N 1/32728; H04N 1/00206; H04N 2201/0093; H04M 1/57
See application file for complete search history.

(56) References Cited

U.S. PATENT DOCUMENTS

| 5,870,458 | A | * | 2/1999 | Pappas | ............... | H04M 11/06 379/100.15 |
| 6,160,872 | A | * | 12/2000 | Karnowski | ............ | H04M 11/06 379/194 |
| 8,515,033 | B2 | * | 8/2013 | Utsumi | ................. | H04N 1/327 358/400 |

FOREIGN PATENT DOCUMENTS

| JP | 62207057 A | * | 9/1987 |
| JP | 2012-049647 A | | 3/2012 |

* cited by examiner

*Primary Examiner* — Stella Woo
(74) *Attorney, Agent, or Firm* — Canon U.S.A., Inc. IP Division

(57) ABSTRACT

The present invention is intended to inhibit off-hook using a hook key in an operation unit to make a caller ID function stably usable in an image communication apparatus connectable to a telephone line and having a caller ID display function. According to one embodiment, the image communication apparatus includes an off-hook unit configured to perform the off-hook using the hook key in the operation unit, a detection unit configured to detect polarity reversal of a telephone line, a receiving unit configured to receive an information service signal, which arrives via the telephone line, after the detection unit has detected the polarity reversal, and a control unit configured to perform control to inhibit the off-hook by the off-hook unit based on the detection of the polarity reversal by the detection unit.

8 Claims, 6 Drawing Sheets

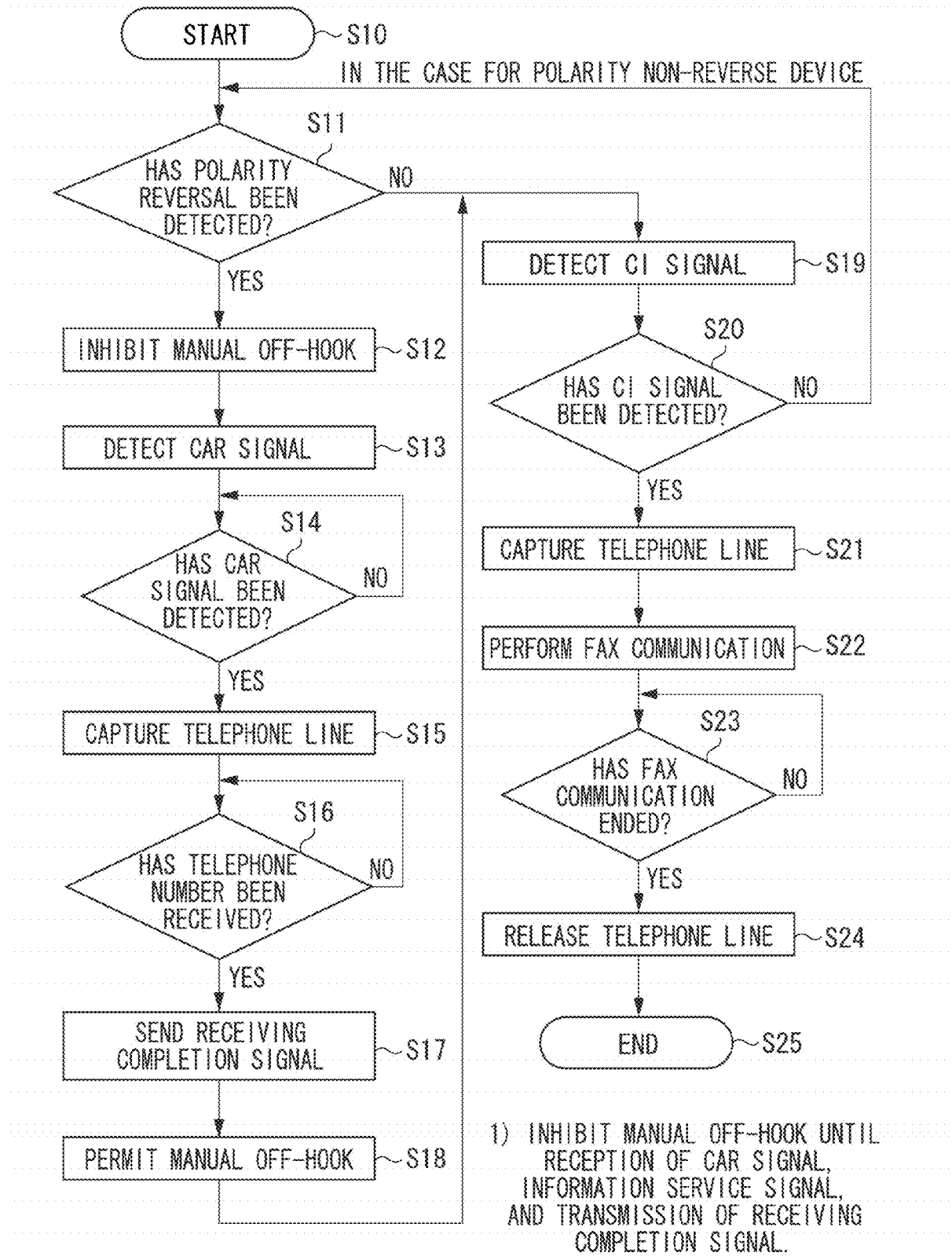

IMAGE COMMUNICATION APPARATUS, METHOD FOR CONTROLLING IMAGE COMMUNICATION APPARATUS, AND STORAGE MEDIUM

BACKGROUND OF THE INVENTION

Field of the Invention

The present invention relates to an image communication apparatus, a method for controlling the image communication apparatus, and a storage medium.

Description of the Related Art

In recent years, a data access arrangement (hereinafter referred to as "DAA") implemented in a semiconductor integrated circuit (IC) has been used for an interface between a modulator-demodulator (MODEM) for facsimile communication and a telephone line. The DAA serves as a Network Control Unit (NCU). The DAA implemented in a semiconductor IC is also referred to as a Silicon DAA (SDAA).

A facsimile communication unit includes a modem and a DAA, a call indicator signal detection circuit, a telephone set off-hook detection circuit, and an Electro-Magnetic Interference (EMI) noise prevention discrete component. Although the DAA is implemented in a semiconductor IC as described above, the periphery of the DAA includes a discrete circuit. The DAA referred here includes the discrete circuit in the periphery of the DAA.

A communication standard differs from country to country. Therefore, by setting a country code of each country to the modem and the DAA, a setting value corresponding to the standard in each country can be set. In facsimile communication, the standard in each country is supported by an operation corresponding to the setting value.

A call indicator (CI) signal and an off-hook state of the telephone set are detected by dedicated circuits, respectively. The CI signal is detected by a CI signal detection circuit, and the off-hook state of the telephone set is detected by an off-hook detection circuit or a line capture function of the DAA. The line capture after detection of the CI signal is performed by the DAA, and even after the line capture has been performed by the DAA, there is sometimes a case where the stop of the CI signal by an exchanging system is delayed. The CI signal is thereby applied to the DAA for several hundred milliseconds. Such a CI signal is referred to as a residual CI signal.

If the residual CI signal is applied to the DAA during the line capture by the DAA, an internal circuit and a peripheral circuit of the DAA may be destroyed by a high voltage. To prevent such a destruction phenomenon, a chip set of the modem and the DAA has a short circuit prevention function for the purpose of preventing circuit destruction due to high-voltage noise, such as the residual CI signal.

The short circuit prevention function is a function of detecting an overcurrent and an overvoltage generated when an excessive voltage is input to a telephone line and of protecting a circuit. When the detected overcurrent and the detected overvoltage have a predetermined value or more, the DAA controls a direct-current (DC) resistance of the line capture circuit to be set high, so that the DAA and a circuit associated therewith are protected from the overvoltage and the overcurrent. With this short circuit prevention function, the circuit can be prevented from destruction.

In addition to the method of protecting the DAA by setting the DC resistance high, the function of protecting the DAA includes a line cut-off function in which the line capture circuit is cut off and line disconnection is performed when noise is larger than a predetermined value.

An image communication apparatus having a caller identification (ID) display function can use a line service of a caller ID display by a line subscription. During a caller ID display mode, a telephone set connected to an external telephone terminal of the image communication apparatus is generally set to a non-ringing mode.

A caller ID display operation includes a specific signal sequence and procedure, described below.

Before the CI signal arrives from a public line network, the polarity of the telephone line is reversed. Then, an information receiving terminal activation (CAR) signal arrives. The CAR signal is a sine wave signal having a voltage of 75 Vrms and a frequency of 16 Hz, and is repeatedly turned on and off at intervals of 500 msec in a signal format.

A telephone set or an image communication apparatus supporting a caller ID display function detects the above described CAR signal and captures a line. During the operation of capturing a line, a primary response signal is returned to the exchanging system. After the primary response signal, an information service signal (telephone number) arrives as information data conforming to V.23 from the exchanging system, and receives the information data using the modem.

Then, the telephone line is released once after the information service signal is received. The telephone number has already been received before the telephone line is released. Thus, a receiving completion signal is returned to the exchanging system.

Then, the CI signal arrives. The arrived CI signal is detected, and the line is captured. Then, the image communication apparatus is activated. The telephone number, which has already been received, is displayed on a display unit in the image communication apparatus. In addition, there is an image communication apparatus of a type having a function of displaying a name of caller and a function of setting a different ringer for each caller.

There is also an image communication apparatus of a type having a caller ID display function in a main body of its external telephone set. In such a case, a telephone number of a caller can also be displayed on the main body of the external telephone set.

As a conventional technique, Japanese Patent Application Laid-Open No. 2012-49647 discusses a facsimile apparatus that performs control, when a CI signal is received from a public line network, not to perform the line capture in a case where the CI signal is currently received, even if the facsimile apparatus receives an instruction for the line capture to the CI signal from a user.

Such a facsimile apparatus can avoid, even in a case where an off-hook operation is performed at any timing by a user for the line capture, a damage which can be caused by an overcurrent flowing through an internal circuit based on the CI signal remaining after the line capture.

Meanwhile, a CAR signal for the caller ID display function is detected in a mode in which a ringer of a telephone set does not ring. A primary response (line capture) is performed, and an information service signal (telephone number) conforming to V.23 is received. The user cannot recognize the above described operation situation. Thus, in the image communication apparatus in the conventional technique, an off-hook operation may be manually performed by a user using a hook key in an operation unit at a timing of when a CAR signal and an information service signal are being received.

In a case where a user performs an off-hook operation using a handset of the external telephone set or a manual off-hook operation using the hook key on the operation unit in the image communication apparatus is performed by a user, the off-hook operation and reception of a CAR signal may occur at the same time depending on a timing.

When such a case happens, the CAR signal becomes a residual CI signal so that the circuit may be damaged and the telephone line may remain released. In an image communication apparatus having a short circuit prevention function, the short circuit prevention function is activated whereby there arises an issue that a telephone line is cut off to protect a circuit. As a result, communication becomes impossible, and a caller needs to redial.

When an off-hook operation and reception of an information service signal occur at the same time, the information service signal cannot be received.

Further, in a case where an off-hook operation is performed at a timing of when there is no signal within an interval of a CAR signal, the short circuit prevention function is not activated. However, in such a case, an information service signal (telephone number), which comes after the CAR signal, cannot be received. As described above, depending on a timing of an off-hook operation, communication for a caller ID display operation cannot be correctly performed.

SUMMARY OF THE INVENTION

According to an aspect of the present invention, an image communication apparatus having a caller ID display function and is connectable to a telephone line, includes an off-hook unit configured to perform off-hook using a hook key in an operation unit, a detection unit configured to detect a polarity reversal of the telephone line, a receiving unit configured to receive an information service signal, which arrives via the telephone line, after the detection unit has detected the polarity reversal, and a control unit configured to perform control to inhibit the off-hook by the off-hook unit based on the detection of the polarity reversal by the detection unit.

Further features of the present invention will become apparent from the following description of exemplary embodiments with reference to the attached drawings.

BRIEF DESCRIPTION OF THE DRAWINGS

FIG. 6 is a flowchart illustrating an operation for reception according to the present exemplary embodiment.

DESCRIPTION OF THE EMBODIMENTS

An embodiment for implementing the present invention will be described below with reference to the drawings.

Figure 1:
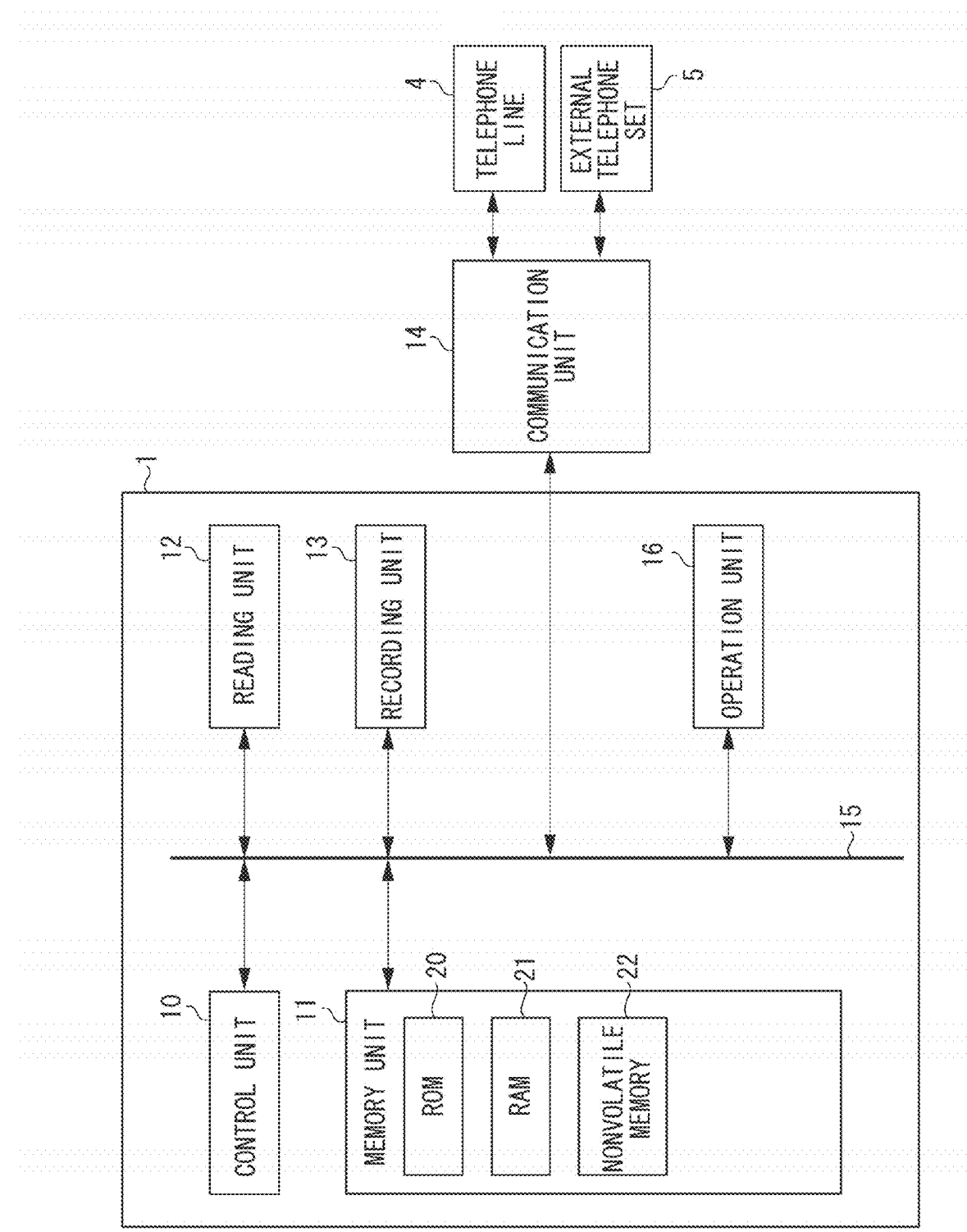
FIG. 1 is a block diagram illustrating an example of a configuration of an image communication apparatus according to the present invention.

The following description is provided to explain a case where the present invention is applied to an image communication apparatus as an embodiment of facsimile (FAX) communication control. The present invention is applicable to all types of an image communication apparatus having a FAX communication function and a caller ID display function. FIG. 1 is a block diagram illustrating a configuration of an image communication apparatus according to the present exemplary embodiment.

[Entire Configuration of System Control Unit 1]

In FIG. 1, a system control unit 1 controls an entire system and its principal functions. A control unit 10 includes a large-scale integration (LSI) for system control and a central processing unit (CPU). A control bus 15 connects blocks with each other. The control unit 10 controls the entire image communication apparatus according to a program stored in a read-only memory (ROM) 20 included in a memory unit 11.

The ROM 20 is a nonvolatile memory, such as a flash memory, and a boot program and a main program for controlling the system are compressed and stored in the ROM 20. A random access memory (RAM) 21 in the memory unit 11 includes a dynamic random access memory (DRAM) and a static random access memory (SRAM), and stores various types of data. The DRAM also serves as a program execution area. The program compressed and stored in the ROM 20 is developed onto the DRAM in the memory unit 11 and is executed when the image communication apparatus is activated.

A nonvolatile memory 22 stores data to be stored, such as an image and setting data, even if with the power to the image communication apparatus is disconnected. Examples of the data include received image data and image data for transmission, a name of a communication partner and dial information about the communication partner, a record of a communication result, and various types of setting data.

A recording unit 13 is a laser beam printer (LBP) or a printer of another type. Recorded data stored in the RAM 21 or the nonvolatile memory 22 is read and transmitted to the recording unit 13 to be printed and output as a hard copy under the control of the control unit 10.

A reading unit 12 is a scanner, and image processing is performed on data which has been acquired using a charge-coupled device (CCD) sensor or a complementary metal oxide semiconductor (CMOS) line sensor (not illustrated) and the processed data is stored in the RAM 21 or the nonvolatile memory 22 under the control of the control unit 10.

A communication unit 14 is connectable to a telephone line 4 and an external telephone set 5 on one side, and is connectable to the control bus 15 on the other side. The communication unit 14 processes a signal from the telephone line 4, performs the line capture, controls the external telephone set 5, and transmits a signal.

An operation unit 16 is used for an operation in various types of operation modes, and includes an input switch and a display device.

[Configuration of Communication Unit 14]

Figure 2:
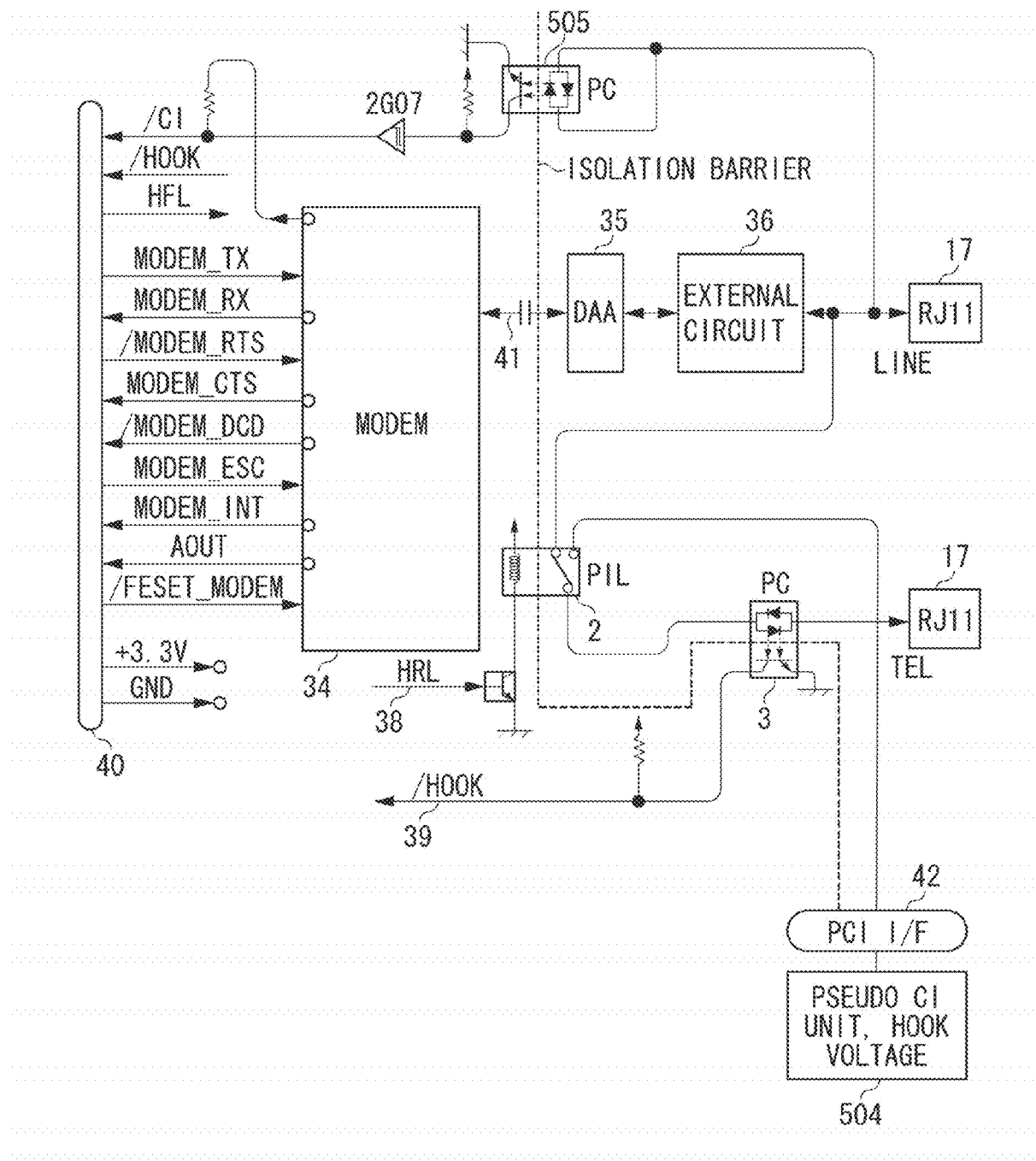
FIG. 2 is a block diagram illustrating an example of a configuration of a communication unit according to the present invention.

A configuration of the communication unit 14 illustrated in FIG. 1 will be specifically described with reference to FIG. 2.

The communication unit 14 includes a modem 34 and a DAA 35, a CI signal detection circuit, an off-hook detection circuit, and line control discrete components that are required to control FAX communication.

The modem 34 includes modems, such as Group 3 (G3) matching International Telecommunication Union Telecommunication (ITUT) recommendations, and clock generation circuits respectively connected to the modems. The modem 34 modulates transmission data stored in the RAM 21 or the nonvolatile memory 22 based on the control of the control unit 10, and outputs the modulated transmission data to the telephone line 4 via the DAA 35. The modem 34 also acquires data received by FAX communication, and stores the data in the RAM 21 or the nonvolatile memory 22.

Further, the modem 34 includes a DAA interface for connection to the DAA 35, a serial interface for connection to the system control unit 1, and performs, for example, image data modulation and demodulation and communication procedure control. The modem 34 includes a control system using a command set, and supports Super-G3 and Super-G4 FAX communication.

An analog signal, which has arrived from the telephone line 4, is input to the modem 34 via the DAA 35. The modem 34 demodulates the input analog signal. The demodulated signal is converted into data having an image format, such as Joint Bi-level Image Experts Group (JBIG), by the system control unit 1, and is stored in the RAM 21 or the nonvolatile memory 22.

The DAA 35 is a data access arrangement device implemented in a semiconductor IC. The DAA 35 functions as the direct current (DC) terminal (line capture), the alternating current (AC) terminal, a calling (CI) signal voltage detection function, a line-to-line impedance adjustment function, and an isolation interface.

A capacitor 41 connects the modem 34 and the DAA 35 to each other. The capacitor 41 is provided to serve as an interface of communication between the modem 34 and the DAA 35 and to isolate between the modem 34 and the DAA 35.

[Information Receiving Terminal Activation (CAR) Signal]

Figure 3:
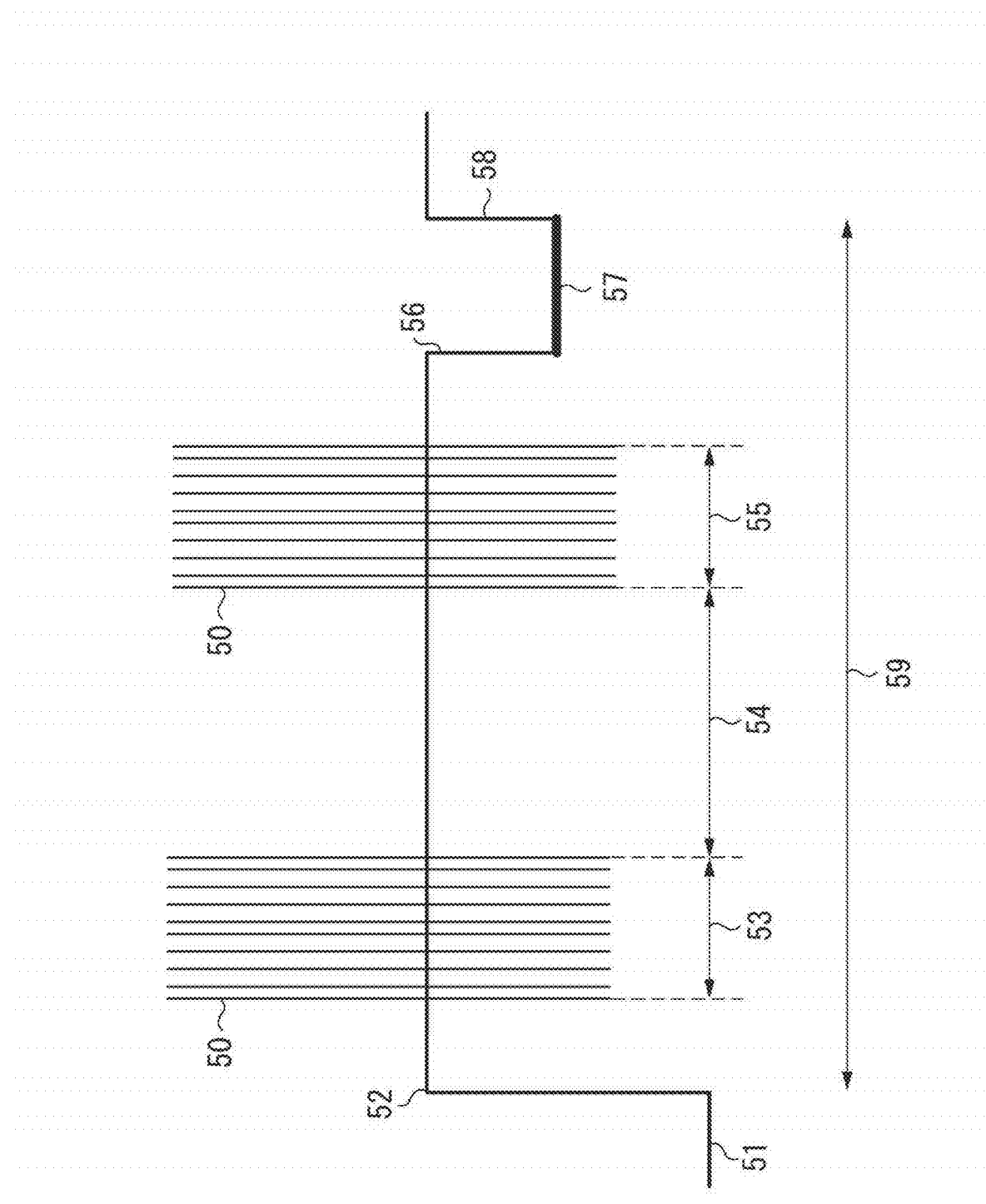
FIG. 3 is a timing chart of a received signal for a caller ID display function according to the present invention.

FIG. 3 illustrates a signal timing of when a caller ID display operation signal has arrived to the communication unit 14 in the image communication apparatus connected to an analog subscriber line exchanging system on a public line network.

A signal 51 indicates a DC level of a telephone line in an on-hook state. A signal 52 indicates polarity reversal of the telephone line before a CAR signal arrives. A signal 50 indicates a CAR signal. A period 53 is a ringing period, and a period 54 is a pause period. As a method for detecting a CI signal, control is performed such that if the CI signal detection circuit 505 (FIG. 5) detects the CAR signal 50 two times, it is determined that the CI signal exists. A primary response signal 56 indicates an operation for capturing a telephone line after the CAR signal 50 is detected. An information service signal 57 indicates a telephone number of a terminal at the other end. A receiving completion signal 58 indicates the end of reception of the information service signal 57.

[Receiving Sequence]

Figure 4:
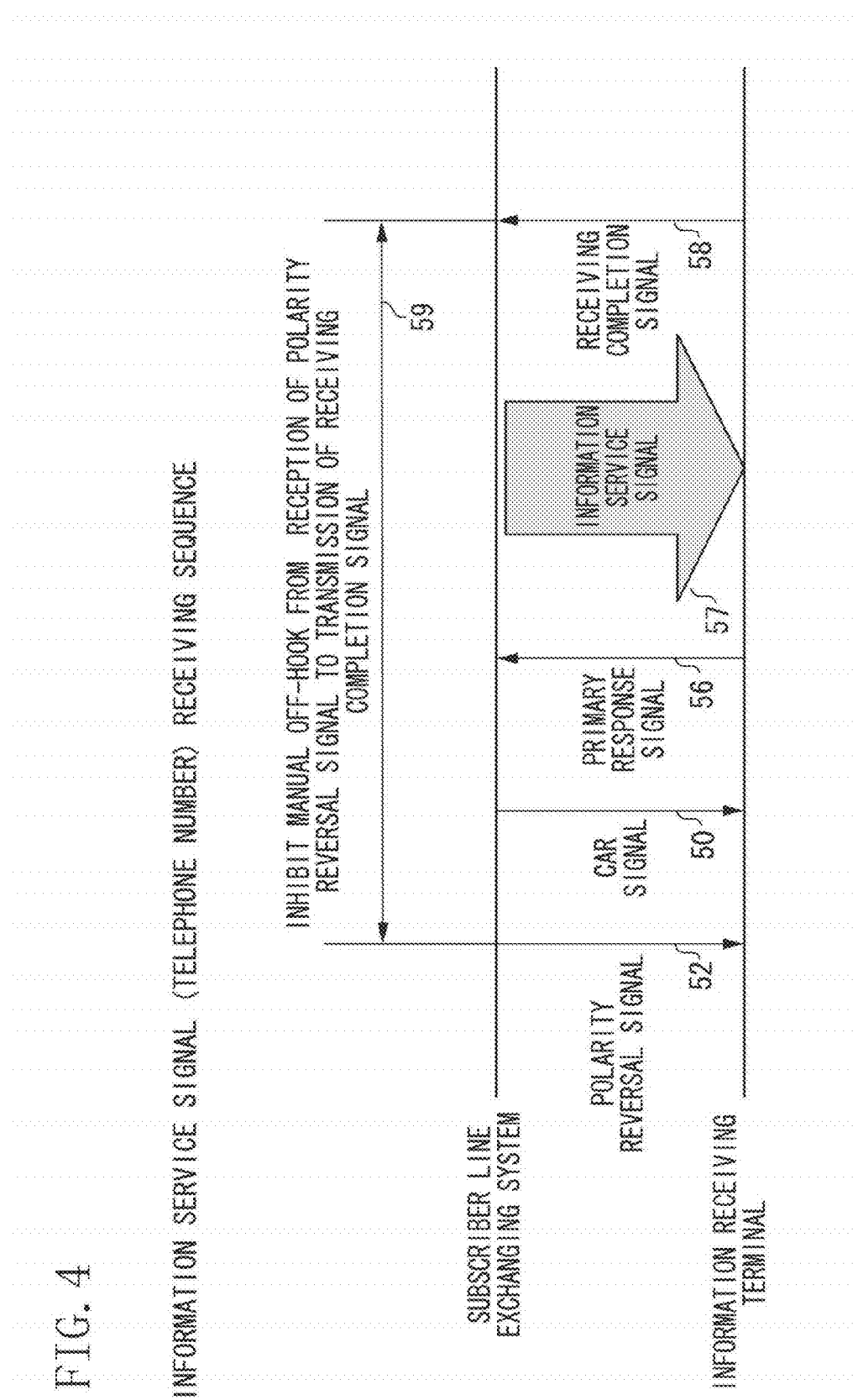
FIG. 4 is a timing chart of an information service signal for the caller ID display function according to the present invention.

FIG. 4 illustrates an information service signal (telephone number) receiving sequence for the caller ID display function. A function of each of the signals will be described below. The polarity reversal signal 52 is a signal indicating polarity reversal of the telephone line. If the polarity reversal signal 52 arrives, the manual off-hook operation is inhibited in a time period 59. The CAR signal 50 is a CAR signal. Since the manual off-hook operation has already been inhibited at this time point, the CAR signal 50 can be reliably received. Since reception of the CAR signal 50 and the manual off-hook operation do not occur at the same time, the circuit does not receive a residual CI signal. Therefore, the circuit is prevented from being damaged and can normally operate.

The primary response signal 56 is used for performing a primary response in response to capturing of the line after the CAR signal 50 is detected.

The information service signal 57 which arrives after the primary response signal 56 indicates a telephone number.

The receiving completion signal 58 is a signal indicating that the telephone number has been received. The notification of reception of the telephone number is performed in such a manner that the line is released. At the timing of this signal, the inhibition of the manual off-hook operation is canceled.

In the above described information service signal receiving sequence, the manual off-hook operation is inhibited in the time period 59 from reception of the polarity reversal signal 52 to transmission of the receiving completion signal 58.

[Configuration and Operation of Communication Unit 14]
(Configuration of Communication Unit 14)

Figure 5:
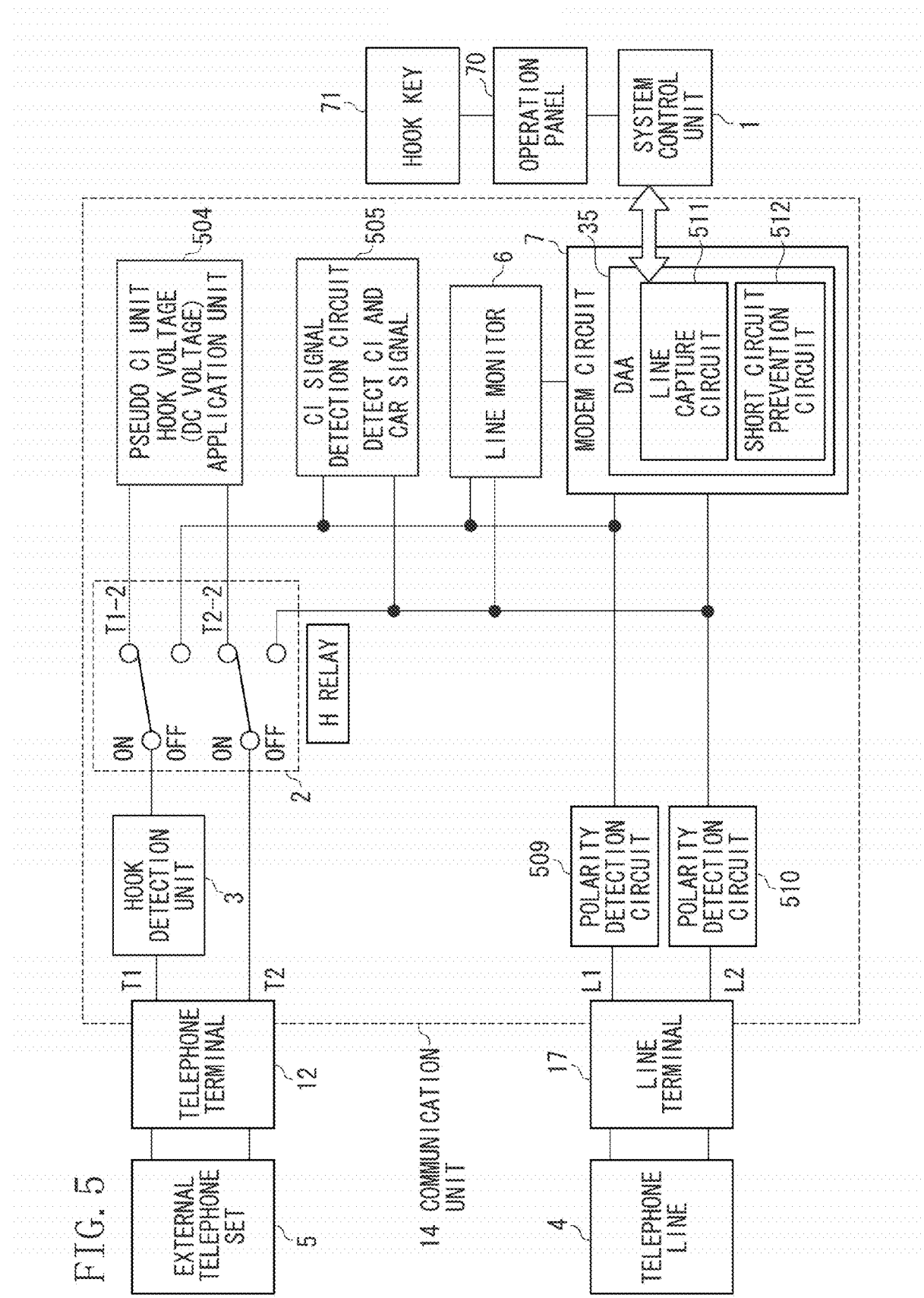
FIG. 5 is a diagram illustrating a configuration example of a circuit control unit according to the present invention.

FIG. 5 is a detailed diagram of the communication unit 14 according to the present exemplary embodiment. The telephone line 4 is connected to a line terminal 17 in the communication unit 14. The communication unit 14 exchanges a signal with the system control unit 1 illustrated in FIG. 1. The system control unit 1 is connected to an operation panel 70. The operation panel 70 is equivalent to the operation unit 16 illustrated in FIG. 1. A hook key 71 is a key included in the operation panel 70 and is for the off-hook operation in response to an instruction from a user. Polarity detection units 509 and 510 are circuits that detect the polarity of the telephone line 4. In the present exemplary embodiment, the polarity detection units 509 and 510 detect polarity reversal of the telephone line 4 before a CAR signal arrives in a caller ID display mode.

A modem circuit 7 transmits and receives a signal for performing FAX communication and detects a signal, and includes a line capture circuit 511 and a short circuit prevention circuit 512.

The line capture circuit 511 performs the line capture when the telephone line 4 is closed.

The short circuit prevention circuit 512 prevents circuit destruction due to a short circuit noise which is applied to the telephone line 4, and has a function of cutting off the telephone line 4 when a voltage and a current having prescribed values or more are applied to the line circuit 511 and protecting the circuit.

A line monitor 6 detects a signal on the line when the line capture is not performed by the modem circuit 7. The CI detection circuit 505 detects a CI signal and a CAR signal.

A pseudo CI unit 504 generates a pseudo CI signal and a HOOK voltage (a DC voltage for HOOK detection) for ringing a bell sound of the external telephone set 5.

An H relay 2 switches the connection between the external telephone set 5 and the pseudo CI unit 504 or the telephone line 4. For example, in the time period 59 during which the manual off-hook operation is inhibited in the caller ID display mode, the external telephone set 5 is disconnected from the telephone line 4, and is connected to the pseudo CI unit 504.

(Operation of Communication Unit 14)

When the CAR signal 50 for a caller ID display function arrives, the polarity of a DC voltage of a line is reversed before the arrival, as shown with the signal 51 and the signal 52. The polarity detection units 509 and 510 in the communication unit 14 illustrated in FIG. 5 detect the polarity of the line. In the case of the CAR signal 50 for the caller ID display function, the CAR signal 50 having the waveform of a sine wave arrives after the polarity of the line is reversed.

The CAR signal 50 is an on-off repetitive signal having a frequency of 16 Hz, a signal level of 75 Vrms, a sine wave shape in a signal format, and a cadence of 0.5 seconds when described by taking a CI signal on a domestic public line as an example. The CAR signal 50 includes an intermittent signal having a sine wave shape in a predetermined period, as illustrated in FIG. 3. The CI signal detection circuit 505 detects the CAR signal 50.

The CI signal detection circuit 505 directly receives a CI signal that has arrived from the telephone line 4, outputs a square wave based on an input signal when a voltage level of the CI signal is a predetermined value or more, and sends the square wave to a predetermined input port of the control unit 10. The control unit 10 measures a cadence input to the input port. If the CAR signal 50 is a valid signal, the line capture circuit 511 in the communication unit 14 captures the line at a timing of when the CAR signal 50 has been paused. The CAR signal is stopped simultaneously with the capturing of the line. The line capture is referred to as a primary response.

After the primary response, the information service signal 57 conforming to V.23 arrives, like in the information service signal (telephone number) receiving sequence illustrated in FIG. 4. The modem circuit 7 in the communication unit 14 receives the information service signal 57. When the reception of the information service signal 57 is completed, the receiving completion signal 58 is sent, and the telephone line 4 is released. Thus, the reception of the information service signal 57 is completed. Then, the CI signal arrives, and a telephone number obtained by the information service signal 57 is used in response to an application of the image communication apparatus 1.

[Control Flow in Caller ID Display Mode]

Control of a caller ID display mode according to the present exemplary embodiment will be described below with reference to a flowchart of FIG. 6.

More specifically, control which is performed to prevent an abnormality in a caller ID display operation by inhibiting a manual off-hook operation in the caller ID display mode in the image communication apparatus according to the present exemplary embodiment will be described. A processing program of the communication unit 14 related to the flow is stored in the ROM 20 in the memory unit 11 in the system control unit 1, is read out to the RAM 21, and is executed by the CPU in the control unit 10.

In step SS11, whether the polarity detection units 509 and 510 have detected polarity reversal of the telephone line 4 is determined. If the polarity reversal has been detected (YES in step S11), the image communication apparatus is in the caller ID display mode. The processing thus proceeds to step S12. If the polarity reversal has not been detected (NO in step S11), the image communication apparatus is in a normal mode other than the caller ID display mode. The processing thus proceeds to step S19.

In step S12, the manual off-hook operation by the user is inhibited, and the processing proceeds to step S13.

In step S13, the CI detection circuit 505 detects a CAR signal.

In step S14, whether a CAR signal has been detected is determined. If a CAR signal has been detected (YES in step S14), the processing proceeds to step S15. If a CAR signal has not been detected (NO in step S14), the processing remains in step S14.

In step S15, the line capture is performed by the modem circuit 7.

In step S16, whether telephone number (number) information of a caller has been received is determined. If the telephone number of the caller has been received (YES in step S16), the processing proceeds to step S17. If the telephone number of the caller has not been received (NO in step S16), the processing remains in step S16 until the telephone number information of the caller is received.

In step S17, a receiving completion signal is sent.

In step S18, the manual off-hook operation is permitted, and the processing proceeds to step S19 to receive a CI signal for FAX communication.

(A case where the polarity reversal has not been detected in step S11 or a case where the reception of an information service signal has been completed)

In step S19, a CI signal is detected.

In step S20, whether a CI signal has been detected is determined. If a CI signal has not been detected (NO in step S20), the processing returns to step S11, and whether the polarity reversal of the telephone line 4 has been detected is determined. If a CI signal has been detected (YES in step S20), the processing proceeds to step S21.

In step S21, the telephone line 4 is captured.

In step S22, FAX communication is performed.

In step S23, whether the FAX communication has ended is determined. If the FAX communication has not ended (NO in step S23), the processing remains in step S23. If the FAX communication has ended (YES in step S23), the processing proceeds to step S24.

In step S24, the telephone line 4 is released, and the processing ends.

According to the above described flow, the manual off-hook operation is inhibited in a period from step S12 to step S17.

The CPU monitors whether the manual off-hook operation has been performed in the period during which the manual off-hook operation is inhibited. If the manual off-hook operation has been detected, interruption processing such as processing for notifying the user of a warning and a situation by an audio message or a message displayed on the display device in the operation unit 16.

As described above, according to the present exemplary embodiment, the manual off-hook operation by the user is inhibited from the time point where a CAR signal has been received until the receiving of the information service signal ends. Accordingly, the information service signal (telephone number) can be reliably received and at the same time the DAA can be prevented from being destroyed by signals.

While the exemplary embodiment has been illustrated above, the present invention can take a form as a system, an apparatus, a method, a program, or a storage medium, for example. More specifically, the present invention may be applied to a system including a plurality of devices, or may be applied to an apparatus including one device.

The present invention includes all configurations serving as combinations of the exemplary embodiments described above.

The present invention can be implemented by processing for feeding a program for implementing one or more functions in the above described exemplary embodiment to a system or an apparatus via a network or a storage medium and causing one or more processors in a computer in the system or the apparatus to read out and execute the program. Alternatively, the present invention can also be implemented by a circuit for implementing one or more functions (e.g., application specific integrated circuit (ASIC)).

Respective structures and contents of various types of data, described above, are not limited to this. The various types of data can respectively have various structures and contents depending on uses and purposes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155926, filed Aug. 6, 2015, which is hereby incorporated by reference herein in its entirety.

What is claimed is:

1. An image communication apparatus which is connectable to a telephone line and has a caller ID display function, the image communication apparatus comprising:
   an off-hook unit configured to perform off-hook using a hook key in an operation unit;
   a detection unit configured to detect polarity reversal of the telephone line;
   a receiving unit configured to receive an information service signal including a telephone number, which arrives via the telephone line, after the detection unit has detected the polarity reversal; and
   a control unit configured to inhibit the off-hook by the off-hook unit based on the detection of the polarity reversal by the detection unit,
      wherein the control until allows the off-hook by the off-hook unit based on reception of the information service signal by the receiving unit after the control unit inhibits the off-hook by the off-hook unit.

2. The image communication apparatus according to claim 1, further comprising a warning unit configured to warn a user in a case where the user has performed the off-hook while the off-hook is inhibited.

3. The image communication apparatus according to claim 2, wherein the warning unit warns the user by an audio message or by displaying of a message.

4. The image communication apparatus according to claim 1, further comprising
   a receiving unit configured to receive a terminal activation signal, and
   a transmission unit configured to transmit a receiving completion signal.

5. An image communication apparatus which is connectable to a telephone line and has a caller ID display function, the image communication apparatus comprising:
   an off-hook unit configured to perform off-hook using a hook key in an operation unit;
   a first receiving unit configured to receive a terminal activation signal that arrives via the telephone line;
   a second receiving unit configured to receive an information service signal, which arrives via the telephone line and includes a telephone number, after the first receiving unit has received the terminal activation signal; and
   a control unit configured to inhibit the off-hook by the off-hook unit from before the first receiving unit receives the terminal activation signal,
      wherein the control unit allows the off-hook by the off-hook unit based on the reception of the information service signal by the second receiving unit after the control unit inhibits the off-hook by the off-hook unit.

6. The image communication apparatus according to claim 5, further comprising a warning unit configured to warn a user in a case where the user has performed the off-hook while the off-hook is inhibited.

7. A method for controlling an image communication apparatus which is connectable to a telephone line, the image communication apparatus including an off-hook unit configured to perform off-hook using a hook key in an operation unit, and having a caller ID display function, the control method comprising:
   detecting polarity reversal of the telephone line;
   receiving an information service signal including a telephone number, which arrives via the telephone line, after the polarity reversal has been detected by the detecting;
   inhibiting the off-hook by the off-hook unit based on the detection of the polarity reversal by the detecting,
      wherein the off-hook by the off-hook unit is inhibited based on reception of the information service signal after the off-hook by the off-hook unit is inhibited.

8. A non-transitory computer readable storage medium storing a program for causing a computer to execute a method for controlling an image communication apparatus which is connectable to a telephone line, the image communication apparatus including an off-hook unit configured to perform off-hook using a hook key in an operation unit, and having a caller ID display function, the control method comprising:
   detecting polarity reversal of the telephone line;
   receiving an information service signal, which arrives via the telephone line and includes a telephone number, after the polarity reversal has been detected by the detecting;
   inhibiting the off-hook by the off-hook unit based on the detection of the polarity reversal by the detecting, wherein the off-hook by the off-hook unit is allowed based on reception of the information service signal after the off-hook by the off-hook unit is inhibited.

\* \* \* \* \*